Figure 1:
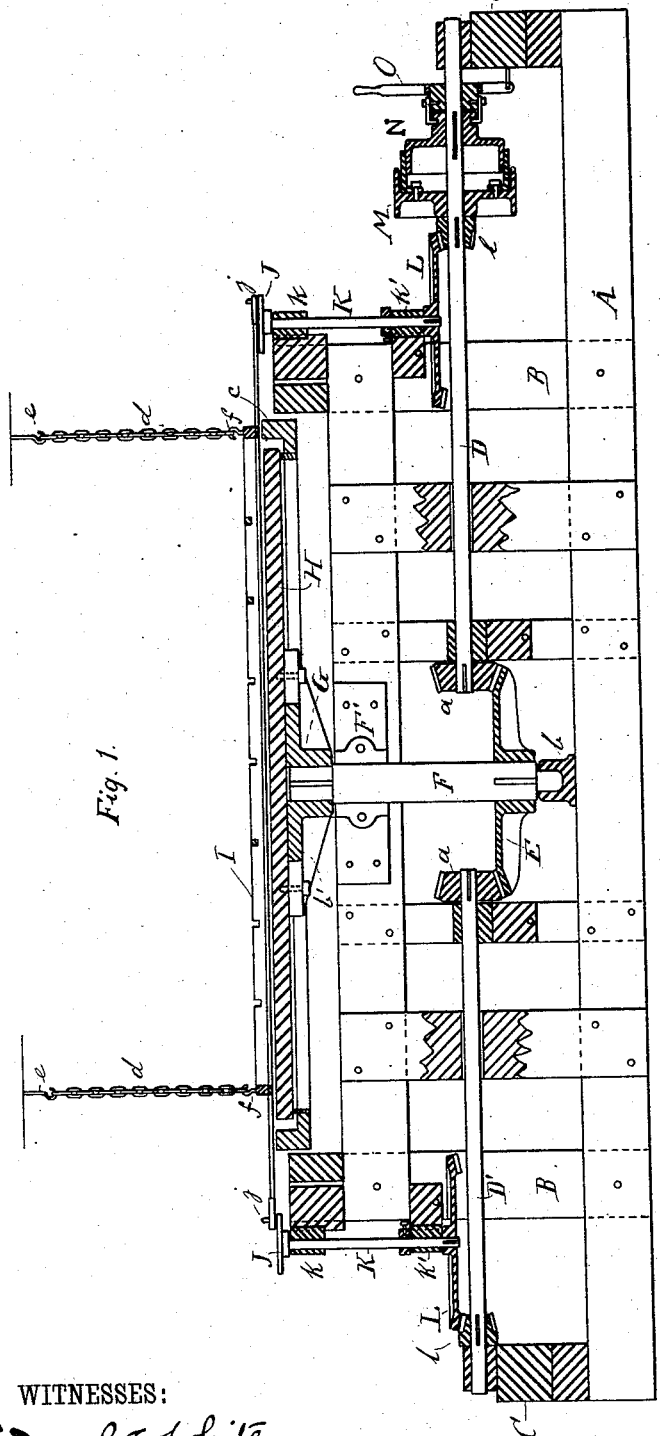

(No Model.)  2 Sheets—Sheet 1.

J. EGER.
MACHINE FOR SMOOTHING STONE.

No. 287,648.  Patented Oct. 30, 1883.

WITNESSES:  INVENTOR
Adam Geo. White  John Eger
M. J. Clagett  BY Wm. C. Lotz
  ATTORNEY

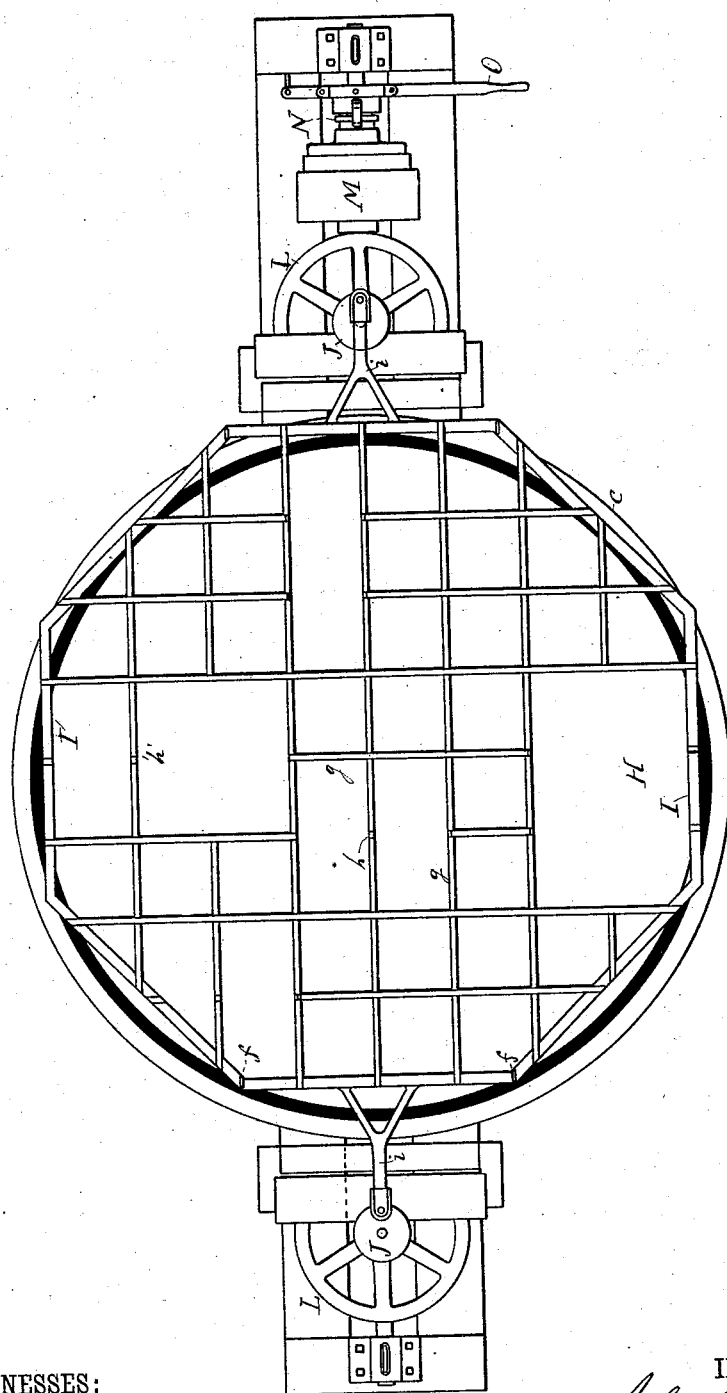

UNITED STATES PATENT OFFICE.

JOHN EGER, OF CHICAGO, ILLINOIS, ASSIGNOR OF THREE-FOURTHS TO WILLIAM H. MEYER AND FREDERICK J. H. WICHMAN, BOTH OF SAME PLACE, AND HENRY BRUEGGEMAN, OF MATTISON, ILLINOIS.

MACHINE FOR SMOOTHING STONES.

SPECIFICATION forming part of Letters Patent No. 287,648, dated October 30, 1883.

Application filed August 21, 1883. (No model.)

*To all whom it may concern:*

Be it known that I, JOHN EGER, a citizen of the United States of America, residing at Chicago, in the county of Cook and State of Illinois, have invented certain new and useful Improvements in Machines for Smoothing Stones, of which the following is a specification, reference being had therein to the accompanying drawings.

My invention relates to a machine for smoothing the rough surfaces of stones.

The object it has in view is to obtain a simple and effective machine for that purpose; and to that end it consists in novel devices and combination of devices, as will be described and claimed.

Reference will be made to the accompanying drawings, in which Figure 1 is a sectional view of the machine, and Fig. 2 a top plan view of the same.

Like letters refer to like parts in both views.

A represents the base of the machine; B, uprights and cross-pieces of the same.

D D' represent two horizontal shafts, which are supported in the cross-pieces of the machine, and have bearings at their outer ends in suitable journal-boxes, as shown. To the inner end of each of these shafts is keyed a cog-wheel, a, which, upon the revolution of shafts D D', meshes with a large bevel-gear wheel, E, keyed upon a vertical shaft, F. Shaft F, at its lower end, has bearing in a socket, b, mounted upon base-plate A, and said shaft passes up through a suitable journal-box, F', secured to the frame-work, as shown in Fig. 1.

Upon the upper end of shaft F is keyed a sleeve or hub, G, provided with a horizontal flange, b', through which bolts are passed to secure said hub to a smoothing plate or table, H. Table H is circular in form, and made preferably of iron, and in its revolution moves within a ring, c, which forms part of the framework of the machine.

Suspended above table H by chains d is a frame, I, for supporting the stones to be operated upon, the chains d being attached at their upper ends to hooks e, suitably located, and at their lower ends to hooks f, secured to frame I. In the drawings I have shown this frame as being made in the shape of an octagon, and that form will be found convenient. The frame is provided with a number of cross-bars, g, which are secured thereto by their ends entering suitable notches in said frame, or in any other suitable manner. Each one of these bars g is also provided with a series of notches, as at h, so that several of said bars may cross each other and be held firmly in position. The object of having these bars thus removably placed together is to afford means whereby any size stone or various sizes of stones at the same time may be placed therebetween to be operated upon. When the stones are placed in the spaces formed by these rods g, their weight will force them down against the revolving smoothing-table H, referred to, and their under surface be acted upon by said table. When one surface of a stone has been thus acted upon, it will be apparent that said stone can be removed and another face or surface brought into contact with table H. To two sides of frame I are secured the radial arms of Y-shaped arms i, the outer ends of said arms being secured each to a crank-pin, j, formed on a crank-wheel, J, as shown. These crank-wheels are each keyed to the upper end of a vertical shaft, K, such shaft having bearings in brackets k k', secured to the frame-work, and have keyed on their lower ends each a wheel, L, now to be referred to. The under face of the circumference of each of these wheels L is provided with cog-teeth, which mesh with the teeth of cogs l, keyed at suitable points, one to each of the shafts D D'. The teeth of wheels L and cogs l are so arranged that said wheels L will revolve in an opposite direction to that of bevel-gear wheel E, which imparts motion to table H. Mounted loosely on shaft D is a driving-pulley, M, which is connected by suitable belting with any motive power. Keyed to shaft D is a clutch, N, which is thrown into and out of gear with pulley M by a lever, O, suitably located for that purpose.

The operation of the machine is as follows: The bars of frame I are adjusted to receive the stone or stones to be operated upon, and the weight of the stones will cause them to rest upon the smoothing-table H. Motion is then imparted to shafts D D', and, through the medium of the cogs secured to the inner ends of said shafts and the bevel-gear wheel keyed to the lower end of the vertical shaft F, motion is imparted to the table H, which is thus caused to revolve below the stones. At the same time, through the medium of cogs $l$, mounted on shafts D D', wheels L, keyed to the lower ends of vertical shafts K, crank-wheels J, keyed to the upper ends of said shafts, and the arms $i$, a reciprocating revolving motion is imparted to frame I, said frame and the smoothing-table moving in opposite directions.

By the arrangement of the different parts, as herein described, a perfect and simple apparatus is obtained, and one in which there is but little danger of the parts getting out of order.

Having thus described my invention, what I claim as new therein, and that for which I desire to secure Letters Patent, is—

1. The combination of a revolving smoothing-table and a circularly-vibrating stone-carrying frame, as described and shown.

2. The combination, with a revolving smoothing-table, of a circularly-vibrating stone-carrying frame provided with adjustable cross-bars, as described and shown.

3. The combination, with smoothing-table H, of stone-carrying frame I, said frame provided with adjustable cross-bars $g$, and suspended by chains $d$, as described and shown.

In testimony whereof I affix my signature in presence of two witnesses.

JOHN EGER.

Witnesses:
M. J. CLAGETT,
LOUIS NOLTING.